(12) United States Patent
Clapie et al.

(10) Patent No.: US 9,381,946 B2
(45) Date of Patent: Jul. 5, 2016

(54) MULTI-FUNCTIONAL SUPPORT FOR A MOTOR VEHICLE

(75) Inventors: Yann Clapie, Stadthagen (DE); Stefan Meder, Stadthagen (DE); Daniel Eichlinger, Stadthagen (DE); Roland Wohlmuth, Stadthagen (DE); Michael Straus, Stadthagen (DE); Karl-Heinz Killersreiter, Stadthagen (DE); Jacques Hoffner, Stadthagen (DE); Pascal Joly-Pottuz, Stadthagen (DE)

(73) Assignee: FAURECIA EXTERIORS GMBH, Stadthagen (DE)

( * ) Notice: Subject to any disclaimer, the term of this patent is extended or adjusted under 35 U.S.C. 154(b) by 144 days.

(21) Appl. No.: 14/003,698

(22) PCT Filed: Mar. 7, 2012

(86) PCT No.: PCT/EP2012/053926
§ 371 (c)(1),
(2), (4) Date: Jan. 21, 2014

(87) PCT Pub. No.: WO2012/120046
PCT Pub. Date: Sep. 13, 2012

(65) Prior Publication Data
US 2014/0167454 A1    Jun. 19, 2014

(30) Foreign Application Priority Data

Mar. 7, 2011    (DE) .......................... 10 2011 013 272
Mar. 11, 2011    (DE) .......................... 10 2011 013 706

(51) Int. Cl.
*B62D 65/16*    (2006.01)
*B62D 25/08*    (2006.01)
(Continued)

(52) U.S. Cl.
CPC .............. *B62D 25/08* (2013.01); *B62D 25/085* (2013.01); *B62D 27/065* (2013.01); *B62D 65/16* (2013.01); *B60R 2019/245* (2013.01); *Y10T 29/49622* (2015.01)

(58) Field of Classification Search
CPC .............. B60R 19/24; B60R 2019/245; B60R 2019/525; B62D 25/085; B62D 65/005; B62D 65/02; B62D 65/04; B62D 65/16
See application file for complete search history.

(56) References Cited

U.S. PATENT DOCUMENTS 4,825,342 A * 4/1989 Gorski ........................... 362/549
5,077,885 A * 1/1992 Kanemitsu et al. ............. 29/430
(Continued)

FOREIGN PATENT DOCUMENTS

DE    2713226 A1 * 9/1978 .............. B60R 19/06
DE    19612479 A1 * 12/1997 .............. B62D 65/00
(Continued)

*Primary Examiner* — Glenn Dayoan
*Assistant Examiner* — Paul Chenevert
(74) *Attorney, Agent, or Firm* — Timothy X. Gibson, Esq.; Gibson & Dernier LLP

(57) ABSTRACT

A multi-functional support for a motor vehicle, wherein the multi-functional support comprises a plurality of mounts for accommodating, in a supporting manner, motor vehicle front elements, wherein the motor vehicle front elements are visible in the installed state in an outside top view of the motor vehicle, wherein the multi-functional support together with the received motor vehicle front elements can be fixed so as to be mounted in a floating manner on a body of the motor vehicle, wherein the floating mounting is designed such that, by releasing the fixing and by displacing the multi-functional support relative to the body, a joint line, which is visible in an outside top view of the motor vehicle, between the motor vehicle front elements and outer motor vehicle trim parts directly adjacent to the motor vehicle front elements can be adjusted in a predefined manner.

20 Claims, 11 Drawing Sheets

(51) Int. Cl.
*B62D 27/06* (2006.01)
*B60R 19/24* (2006.01)

(56) References Cited

U.S. PATENT DOCUMENTS

| | | | |
|---|---|---|---|
| 5,080,412 A * | 1/1992 | Stewart et al. | 293/155 |
| 5,106,148 A * | 4/1992 | Ikeda et al. | 296/203.02 |
| 5,155,891 A * | 10/1992 | Yoshii et al. | 29/430 |
| 5,358,304 A * | 10/1994 | Kanemitsu et al. | 296/193.09 |
| 6,205,638 B1 * | 3/2001 | Yustick | 29/464 |
| 6,282,769 B1 * | 9/2001 | Longo et al. | 29/417 |
| 6,729,008 B2 * | 5/2004 | Nishijima | 29/458 |
| 2005/0023864 A1* | 2/2005 | Lazzeroni et al. | 296/203.02 |
| 2005/0074276 A1* | 4/2005 | Luetze et al. | 403/14 |
| 2006/0250899 A1* | 11/2006 | Clapie | 369/1 |
| 2010/0231006 A1* | 9/2010 | Okabe | B62D 25/084 296/203.02 |
| 2010/0303582 A1* | 12/2010 | Choi et al. | 411/366.1 |
| 2011/0304176 A1* | 12/2011 | Kihara | B60K 11/04 296/193.09 |
| 2014/0192549 A1* | 7/2014 | Townson et al. | 362/548 |
| 2015/0291113 A1* | 10/2015 | Farrington | B60R 19/24 29/897.2 |

FOREIGN PATENT DOCUMENTS

| | | | | |
|---|---|---|---|---|
| DE | 19634558 A1 * | 3/1998 | | F16B 2/18 |
| DE | 10010709 C1 * | 8/2001 | | B62D 25/147 |
| DE | 10253177 A1 * | 5/2004 | | F16B 5/06 |
| DE | EP 1747976 A2 * | 1/2007 | | B62D 27/02 |
| DE | 102005051473 A1 * | 5/2007 | | F16B 5/00 |
| DE | 102006008216 A1 * | 8/2007 | | B62D 65/02 |
| DE | 102006039685 A1 * | 2/2008 | | B60R 19/38 |
| DE | 102008032169 A1 * | 3/2009 | | B60R 19/24 |
| DE | 102008051290 A1 | 4/2010 | | |
| DE | 102009058559 A1 * | 7/2010 | | B62D 25/08 |
| DE | 102005057116 B4 * | 9/2010 | | B60Q 1/0416 |
| DE | 102011017156 A1 * | 12/2011 | | B60R 19/24 |
| DE | 102011017157 A1 * | 12/2011 | | B60R 19/24 |
| DE | 102012109940 A1 * | 4/2014 | | F16B 2/18 |
| DE | 102012110652 A1 * | 5/2014 | | B60R 19/18 |
| EP | 0601937 A1 * | 6/1994 | | B60R 19/24 |
| EP | 1070639 A1 | 1/2001 | | |
| EP | 1852332 A1 * | 11/2007 | | B62D 25/10 |
| EP | 2127956 A1 * | 12/2009 | | B60R 19/26 |
| FR | 2915952 A1 * | 11/2008 | | B62D 65/02 |
| FR | 2917036 A1 * | 12/2008 | | B60R 19/24 |
| FR | 2919258 A1 * | 1/2009 | | B62D 25/00 |
| FR | 2940234 A1 * | 6/2010 | | B62D 65/06 |
| FR | 2961768 A1 * | 12/2011 | | B60R 19/24 |
| WO | WO-99/21748 A1 | 5/1999 | | |
| WO | WO-00/03909 A1 | 1/2000 | | |
| WO | WO-2008/101451 A1 | 8/2008 | | |
| WO | WO 2008101451 A1 * | 8/2008 | | B60Q 1/04 |
| WO | WO 2011077021 A1 * | 6/2011 | | B62D 25/08 |

* cited by examiner

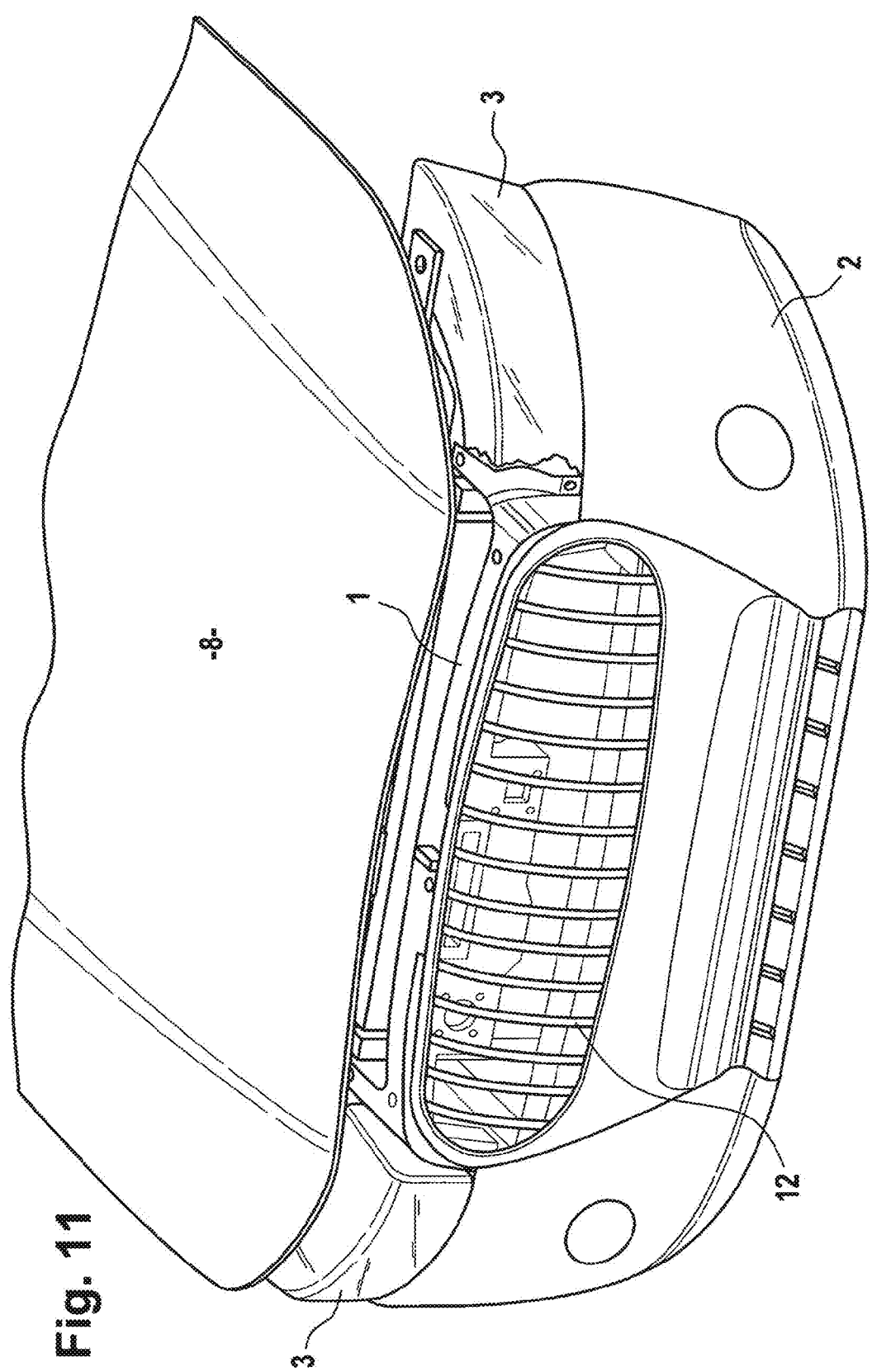

MULTI-FUNCTIONAL SUPPORT FOR A MOTOR VEHICLE

BACKGROUND

The invention relates to a multi-functional support for a motor vehicle, a system comprising a multi-functional support, and a method for installing motor vehicle front elements to a body of a motor vehicle.

Motor vehicle front elements, such as bumpers, spoilers, radiator grilles and headlights, are visible in the installed state when a motor vehicle is viewed from the outside. It is therefore important that these motor vehicle front elements have an optimal joint pattern with respect to external motor vehicle trim parts directly adjacent thereto, such as the wings (front quarter body panels) and engine cover (hood). The spatial distance between these external motor vehicle trim parts and the motor vehicle front elements in the form of said joint pattern requires the presence of adjustment elements, by means of which the joint spacing can be controlled. In the case of modular superstructures with a multiplicity of motor vehicle front elements, the front elements for example are provided with separate adjustment elements in order to be adjusted during the installation process in order to obtain an optimal joint pattern.

The joint patterns, which may be different, when installing the motor vehicle front elements on the motor vehicle body result for example from tolerances during the manufacture of the body, thus resulting in changes to the desired position of the motor vehicle front elements.

SUMMARY OF THE INVENTION

The object of the invention is to create a multi-functional support for a motor vehicle, a system comprising a multi-functional support, and a body as well as an improved method for installing motor vehicle front elements on a body of a motor vehicle.

The objects of the invention are solved by the features of one or more embodiments disclosed and/or described herein.

A multi-functional support for a motor vehicle is specified, wherein the multi-functional support has a plurality of mounts for accommodating, in a supporting manner, motor vehicle front elements, wherein the motor vehicle front elements in the installed state are visible in an outside top view of the motor vehicle, wherein the multi-functional support together with the received motor vehicle front elements can be fixed so as to be mounted on a body of the motor vehicle. The mounting is formed such that, by releasing the fixing and by displacement of the multi-functional support relative to the body, a joint line, which is visible in an outside top view of the motor vehicle, between the motor vehicle front elements and external motor vehicle trim parts directly adjacent to the motor vehicle front elements can be adjusted in a predefined manner. The multi-functional support is thus mounted in a floating manner and can be fixed in desired positions relative to the body.

Embodiments of the invention could have the advantage that, by means of a simple adjustment process in the form of the displacement of the multi-functional support, the joint pattern is optimised and can be adjusted in a predefined manner. It is therefore preferable for the entire joint line to be adjusted exclusively by a precise displacement of the multi-functional support relative to the body. That is to say, instead of adjusting and optimising all motor vehicle front elements individually, the entire multi-functional support together with the received motor vehicle front elements is fixed on the body in an optimised manner in a first process step. Only when this displacement of the multi-functional support does not lead to an optimal joint pattern or joint line can a fine adjustment of the individual motor vehicle front elements themselves relative to the multi-functional support be carried out additionally. On the whole, an aesthetically pleasing joint pattern can therefore be achieved by just a few steps concerning the readjustment of the relative position of the multi-functional support and vehicle body.

Since a multi-functional support that is fastened to the body and itself is a support for the motor vehicle front elements is therefore used, the adjustment of the motor vehicle front elements relative to the outer motor vehicle trim parts can be substantially simplified and optimised on the whole. Furthermore, this opens up new possibilities for the physical three-dimensional design of the motor vehicle front elements themselves. In an optimum scenario, a separate adjustment and positional optimisation of the motor vehicle front elements with respect to the outer motor vehicle trim parts is unnecessary due to the use of the multi-functional support. All motor vehicle front elements are therefore adjusted together in a single process step by means of displacement and adjustment of the multi-functional support.

It is noted that the fixing of the multi-functional support to the body is to be understood to mean both a direct and also an indirect fixing to the body. For example, the multi-functional support can be connected directly to the body or indirectly via components that are to be fastened to the body, such as crash boxes, support parts, mounting supports and reinforcement parts of a motor vehicle. It is also generally possible to fix the multi-functional support to the body via energy-absorbing elements in order to absorb, in the event of a crash, the forces acting on the motor vehicle front elements via the multi-functional support instead of deflecting these forces directly onto the body.

In accordance with an embodiment of the invention, the multi-functional support is automatically displaceable in a first direction relative to the body by means of a resilient element between the multi-functional support and the body once the fixing has been released. For example, the multi-functional support can be supported on the body via a spring element, such that, by releasing the fixing, the multi-functional support is forced in a specific preferred direction. Here, it is noted that this first direction does not have to be only an individual "straight" direction exclusively, but that it is also possible for this first direction to include a movement over a curved path of the multi-functional support relative to the body.

The multi-functional support is preferably biased relative to the body by means of the resilient element such that, by releasing the fixing, the automatic movement in the first direction is performed.

Due to the automatic movement and automatic displacement, a corresponding adjustment process is simplified. For example, by releasing the fixing, a manual displacement in a second or third direction can be released, wherein the automatic displacement in the first direction is additionally enabled. Due to the fact that the multi-functional support is mounted in a floating manner, the end position of the multi-functional support and therefore of the motor vehicle front elements relative to the body and therefore also relative to the outer motor vehicle trim parts can therefore be fixed in a very simple manner by an individual carrying out the installation process.

In accordance with an embodiment of the invention, the multi-functional support comprises a rotatable adjustment aid, wherein the adjustment aid is designed to be supported on the multi-functional support and on the body, wherein, by rotating the adjustment aid, the multi-functional support is displaceable in a second direction relative to the body once the fixing has been released. It is therefore possible via a suitable assembly tool, such as a screwdriver or spanner, to move the multi-functional support in the second direction in a controlled manner by means of an individual rotational movement. In other words, instead of displacing the motor vehicle front elements relative to the body in a rather uncontrolled manner from the outside by exerting a force onto the multi-functional support or even the motor vehicle front elements, it is sufficient to move the multi-functional support in the second direction by means of an individual tool with use of the adjustment aid.

For example, the adjustment aid has an eccentric that can be supported against the body and/or against the multi-functional support. Alternatively, it is possible for the adjustment aid to have a screw, wherein the screw is secured against an axial displacement in the direction of the screw axis and is fixed in an axially non-displaceable manner on the multi-functional support or on the body, wherein the body or the multi-functional support has a nut formed in the manner of a counterpart and secured against movement for accommodating the screw rotatably.

In accordance with a further embodiment of the invention, the fixing after completion of the displacement of the multi-functional support into an end position and therefore after attainment of the desired joint image is reproducible. In other words, in a first process step, the fixing can first be released for displacement of the multi-functional support. Once the multi-functional support has been displaced into the end position, this fixing can then be reproduced, that is to say this release of the fixing is reversed. In addition, it is possible to fix the multi-functional support on the body in the end position by means of additional fastening means.

In accordance with an embodiment of the invention, the multi-functional support is rigid. It is thus ensured that the position of the motor vehicle front elements relative to one another is defined in a fixed manner. Indeed, the motor vehicle front elements can be removed from the multi-functional support by releasing corresponding fixings or can be fixed on the multi-functional support in a specific position. Since, however, the motor vehicle front elements have been received in a supporting manner by the multi-functional support and have been fixed thereon, a displacement of these motor vehicle front elements relative to one another is no longer possible due to the rigidity of the multi-functional support. A displacement of the multi-functional support itself relative to the body therefore clearly and reproducibly causes a relative displacement of motor vehicle front elements and body or outer motor vehicle trim parts.

In accordance with a further embodiment of the invention, the motor vehicle trim parts comprise an engine cover, wherein the first direction is the z-direction of the motor vehicle. For example, the automatic displacement in the first direction could be caused by the closure of the engine cover itself. By applying an optional spacer between the engine cover and a corresponding motor vehicle front element installed on the multi-functional support, the multi-functional support and therefore the motor vehicle front elements can be brought into an end position by closing the engine cover. If, in this end position, the final fixing of the multi-functional support on the body is implemented, the desired joint pattern or the desired joint line between the motor vehicle front elements and the engine cover is thus produced.

In this case, the automatic displacement of the multi-functional support in the z-direction is preferably a displacement in the direction of the engine cover. When closing the engine cover, the lower edge of the engine cover thus presses indirectly against the multi-functional support, such that the multi-functional support can be pressed into its end position against the force of the resilient element.

In accordance with a further embodiment of the invention, the motor vehicle front element is constituted by design parts.

For example, the motor vehicle front elements comprise a headlight, a radiator grille, a bumper and/or a spoiler.

In accordance with a further embodiment of the invention, the displacement of the multi-functional support relative to the body is a displacement in three dimensions.

For displacement in these three dimensions, said adjustment aids can be used individually or in multiple. For example, one adjustment aid can be used for a movement in the x-direction, another adjustment aid can be used for a movement in the y-direction, and said resilient element can be used for a movement in the z-direction. It is possible for a displacement for the multi-functional support in a predetermined direction to be caused by a manual application of force exerted externally onto the multi-functional support or the motor vehicle front elements.

In accordance with a further embodiment of the invention, the multi-functional support has a primary direction of extension in the transverse direction of the motor vehicle. It is therefore possible to mount on the multi-functional support all relevant motor vehicle front elements which are visible in the installed state in an outside top view of the motor vehicle.

It should be noted at this juncture that the "installed state" is any state in which the motor vehicle is supplied to the end customer. This state is the state in which the joint line is adjusted in the predefined manner, that is to say in which the multi-functional support is located in the fixed end position.

In accordance with a further embodiment of the invention, the multi-functional support extends over the entire width of the body.

In accordance with a further embodiment of the invention, the multi-functional support is formed in one piece.

In a further aspect, the invention relates to a multi-functional support as described above and to a body.

In a further aspect, the invention relates to a method for installing motor vehicle front elements on a body of a motor vehicle, wherein the motor vehicle front elements in the installed state are visible in an outside top view of the motor vehicle, wherein the method comprises the following steps:
  installation of the motor vehicle front elements on a multi-functional support, wherein the multi-functional support has a plurality of mounts for accommodating, in a supporting manner, the installed motor vehicle elements,
  fixing of the multi-functional support supporting the motor vehicle front elements to the body with use of a floating mounting of the multi-functional support on the body,
  release of the fixing and displacement of the multi-functional support relative to the body, wherein the displacement is performed such that a joint line, which is visible in an outside top view of the motor vehicle, between the motor vehicle front elements and outer motor vehicle trim parts directly adjacent to the motor vehicle front elements is adjusted in a predefined manner,
  final fixing of the multi-functional support to the body.

A method for joint-accurate fastening of design parts, such as bumpers, spoilers, radiator grilles and headlights, to adjacent component parts, such as crossmembers, crash boxes, mounting supports, closing parts or reinforcement parts and support parts of a motor vehicle, is also described, wherein, during the fastening process, the joint line, that is to say the distance between the design parts and the adjacent component parts, is adjusted and then fixed, wherein a multi-functional support is used that is fastened to the adjacent component parts and is the support for the design parts, and the joint line is adjusted exclusively by adjusting the multi-functional support when this is fastened to the adjacent component parts and is fixed after the adjustment of the multi-functional support.

For example, the multi-functional support is formed as a cover of the cooler or cooling fan.

For example, the multi-functional support is fastened in a manner biased by a resilient element in or against the direction of adjustment and is then adjusted and then fixed or fixed against bias.

In accordance with an embodiment of the invention, an edge of the multi-functional support is U-shaped with rounded corners.

In accordance with an embodiment of the invention, the multi-functional support is fastened in a floating manner to the adjacent component parts, wherein, by actuation of the adjacent component parts, the multi-functional support aligns itself automatically or is manually aligned and is then permanently fixed, for example by screws.

In accordance with an embodiment of the invention, the multi-functional support is fastened in a floating manner to crash boxes. For example, it is aligned automatically with the engine cover by closing the engine cover, which has already been aligned previously. It is also possible for the multi-functional support to be aligned by means of mechanical adjustment elements. It is then fixed permanently, for example by being screwed or clipped in place.

In accordance with an embodiment of the invention, the multi-functional support is biased and fixed by a resilient element, wherein it is aligned once the engine cover has been closed by means of relaxation and subsequent fixing.

The multi-functional support preferably extends parallel to the crossmember and along the width of the vehicle. It can thus receive practically all design parts on the front side of the motor vehicle.

In preferred embodiments, the multi-functional support is formed in one piece. It can thus be produced easily and additionally provides the necessary supporting capacity for the design parts. In addition, the multi-functional support can also be formed as a cover of the radiator or cooling fan or as a cover of the design parts.

The multi-functional support is used to align the design parts, to fasten said design parts, and simultaneously provides a supporting structure for further components, such as sensors and cameras.

By adjusting the multi-functional support, all design parts are adjusted simultaneously, whereby the tolerance chain is considerably reduced. This system is decoupled from the structure of the motor vehicle.

In a preferred embodiment, the multi-functional support is preferably fastened displaceably or in a floating manner in three dimensions for adjustment on a flexible mount and is fixed after the adjustment. This fastening on the flexible mount is a type of pre-assembly. After the fastening process, the adjustment and then fixing processes are carried out.

In an embodiment of the method, the multi-functional support can be fastened by a resilient element in a manner biased in or against the direction of adjustment and can then be adjusted and then fixed or fixed against biased. The adjustment process can thus be carried out more easily. In addition, the adjustment process can also be carried out automatically, which will be described further below.

The biasing just described can also be integrated into the multi-functional support, more specifically such that the geometry of the multi-functional support at its edge is formed in the manner of a spring. The edge acting as a spring then bears against an adjacent component part. The edge is preferably U-shaped, L-shaped or S-shaped with rounded corners. Due to this geometry, the edge is itself resilient and acts similarly to a spring.

Due to the invention, the joint line for all design parts fastened thereto can be produced by means of a single process. This occurs mechanically, for example using an adjustment tool.

Alternatively, the fastening can be implemented by a flexible mounting of the supporting multi-functional support, in such a way that the multi-functional support and the design parts adjust automatically to the surrounding parts. During the installation process, the design parts arranged on the multi-functional support are attached to the surrounding parts, such as an engine cover. The design parts or the multi-functional support align themselves automatically during this process by means of the flexible mounting or can be adjusted manually. The multi-functional support and therefore the design parts are then fixed. The joint line is then adjusted correctly. The additional effort of a readjustment process is thus omitted.

The multi-functional support is used to align and to fasten the design parts. It is constructed such that it can be fastened displaceably, preferably in three dimensions.

BRIEF DESCRIPTION OF THE DRAWINGS

Preferred embodiments of the invention will be explained in greater detail hereinafter with reference to the drawings, in which:

FIG. 4a shows a sectional view of a hollow screw, FIG. 8a shows a sectional view of a hollow screw, FIG. 9a shows a sectional view of a resilient element, FIG. 11 shows a schematic view of a multi-functional support and an engine cover.

DETAILED DESCRIPTION OF THE INVENTION

Similar elements will be denoted hereinafter by the same reference signs.

Figure 1:
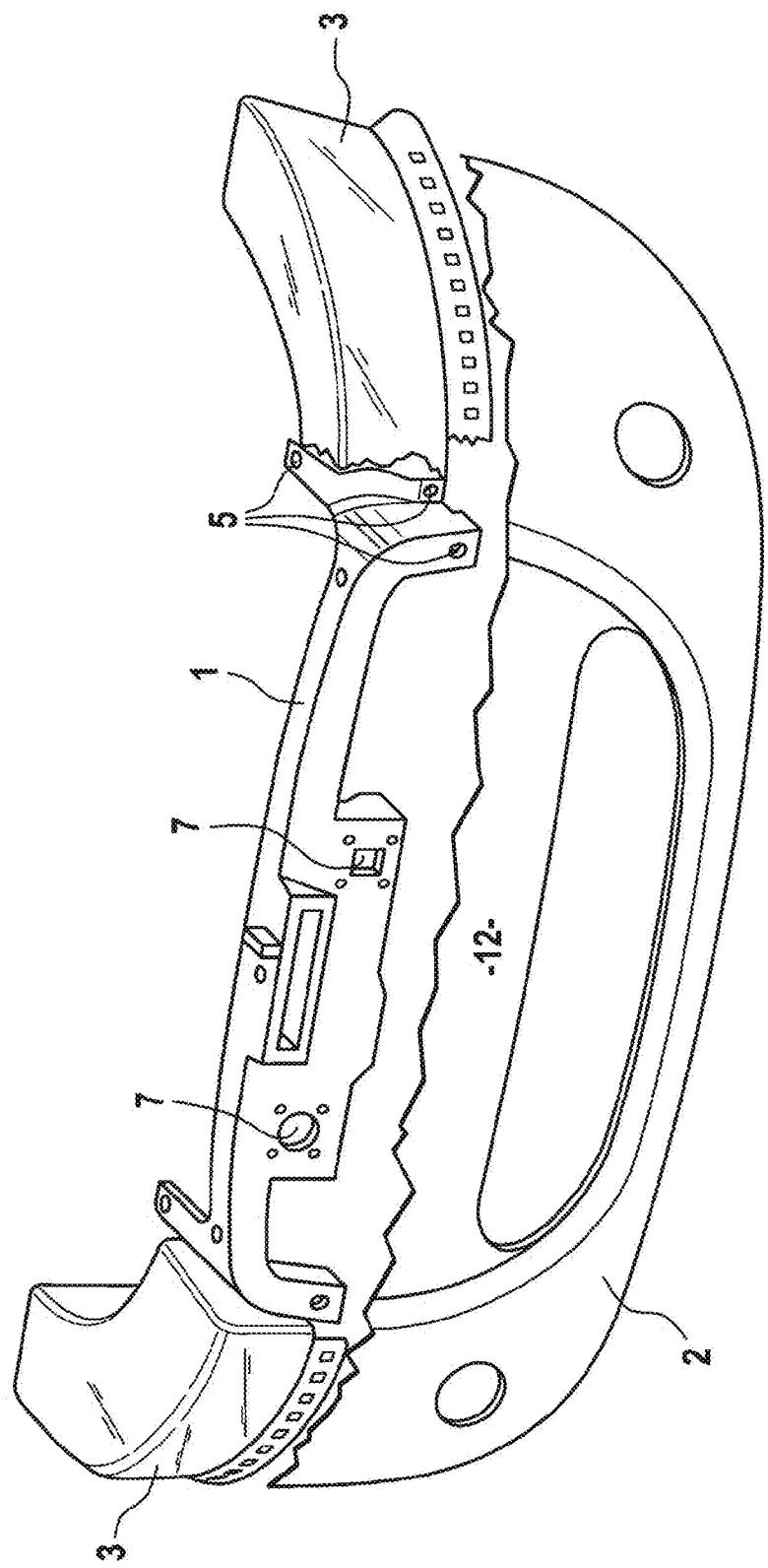
FIG. 1 shows a multi-functional support with a plurality of motor vehicle front elements.

FIG. 1 shows a multi-functional support 1 for a motor vehicle, wherein the multi-functional support supports a plurality of motor vehicle front elements. For example, the multi-functional support supports a bumper 2, a radiator grille 12, and a headlight 3. The multi-functional support 1 can be fixed together with these motor vehicle front elements 2, 3 and 12 to a body of a motor vehicle. This is shown in FIG. 2, wherein, for the sake of clarity, both the radiator grille 12 and the bumper 2 (which can also be formed in a number of parts) have been omitted here.

Figure 2:
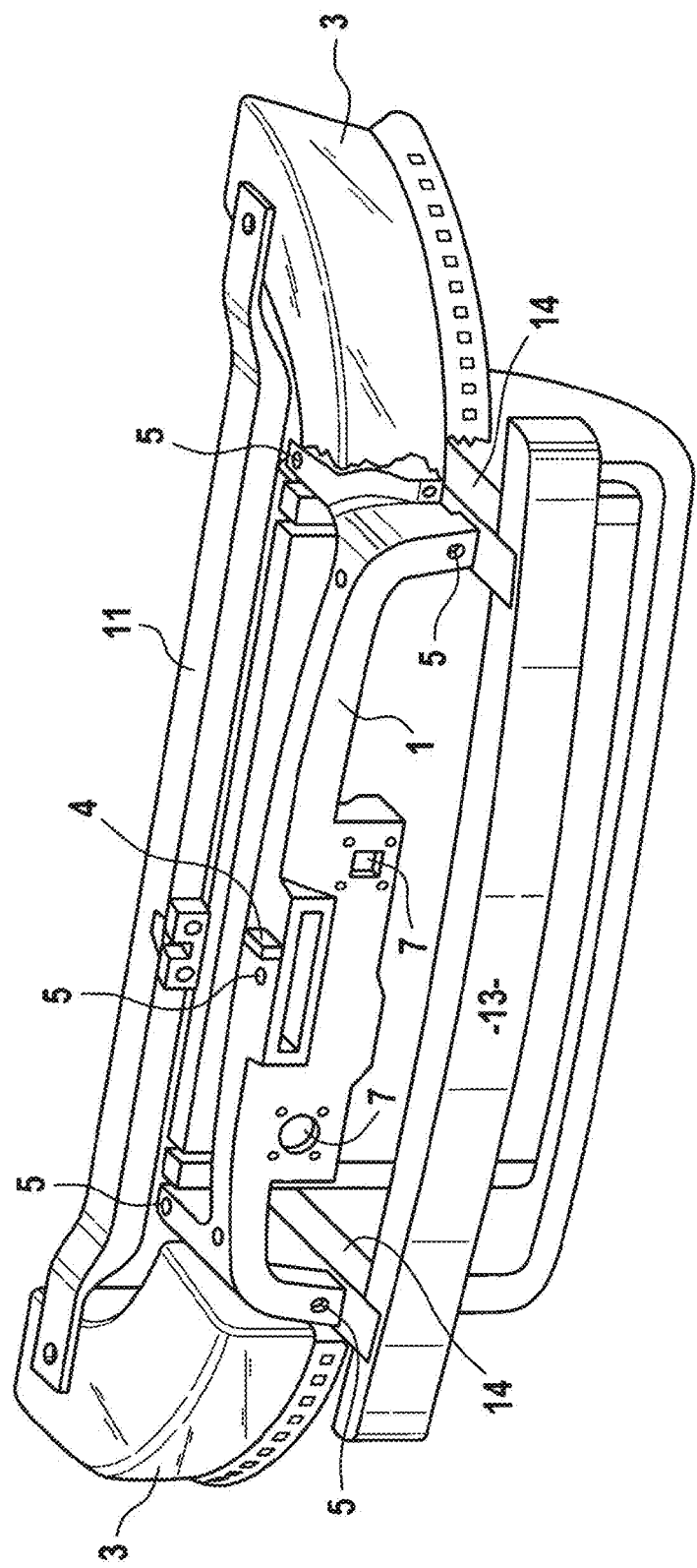
FIG. 2 shows a multi-functional support with motor vehicle front elements in the state installed on the body.

FIG. 2 shows a crossmember 13 of a motor vehicle, wherein the crossmember 13 is part of the body. The crossmember 13 is fastened via crash boxes 14 to the body of the motor vehicle, wherein the multi-functional support 1 can be fastened either directly and indirectly to the body via fastening points 5 or can be fastened for example via the crash boxes 14 to the body. The multi-functional support 1 can also be fastened to another structural part, such as a crossmember 13 or support part 11. The multi-functional support 1 extends practically over the entire width of the vehicle and has a primary direction of extension in the transverse direction of the motor vehicle. In the case of FIG. 2, the multi-functional support 1 extends from one crash box 14 to the other.

Reference sign 7 denotes fastening points for a camera and a sensor, wherein the multi-functional support likewise serves as a fastening element for these parts and provides these parts with a particularly stable fastening.

Figure 3:
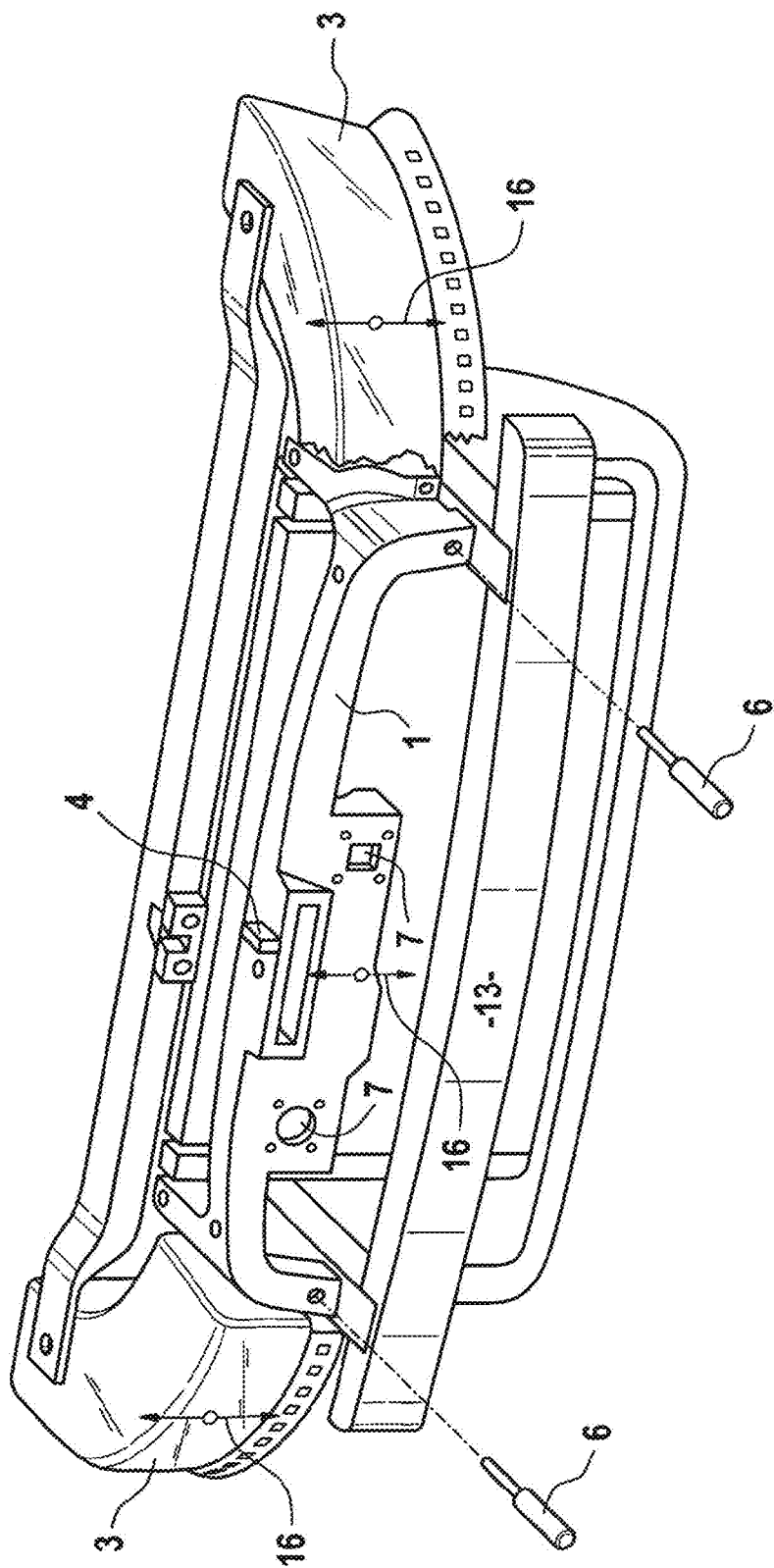
FIG. 3 shows a schematic view of a use of adjustment aids.

In order to then ensure an aesthetically pleasing joint line between said motor vehicle front elements, such as the headlights 3, and an outer motor vehicle trim part (not visible in greater detail in FIG. 2) in an outside top view of the motor vehicle, the multi-functional support 1 is mounted in a floating manner on the body, in the present case on the crash boxes 14. This will be explained hereinafter with reference to FIGS. 3-8:

In FIG. 3, the multi-functional support 1 is visible, wherein, by use of an assembly tool 6 and rotation of the tool 6, the multi-functional support 1 can be displaced in the z-direction, that is to say in direction 16. For example, the tool 6 engages in an adjustment aid of the multi-functional support, which is rotatable, wherein, by rotating the adjustment aid via the tool 6, the multi-functional support is displaceable in direction 16 relative to the body. For example, an eccentric is supported on the multi-functional support, wherein, by rotating the eccentric, the distance between the multi-functional support 1 and the body or crash boxes 14 is varied.

It is noted that the z-direction of the motor vehicle is understood to mean the vertical direction of the motor vehicle, the y-direction of the motor vehicle is understood to mean the transverse direction of the motor vehicle, and the x-direction is understood to mean the longitudinal direction of the motor vehicle.

Figure 4:
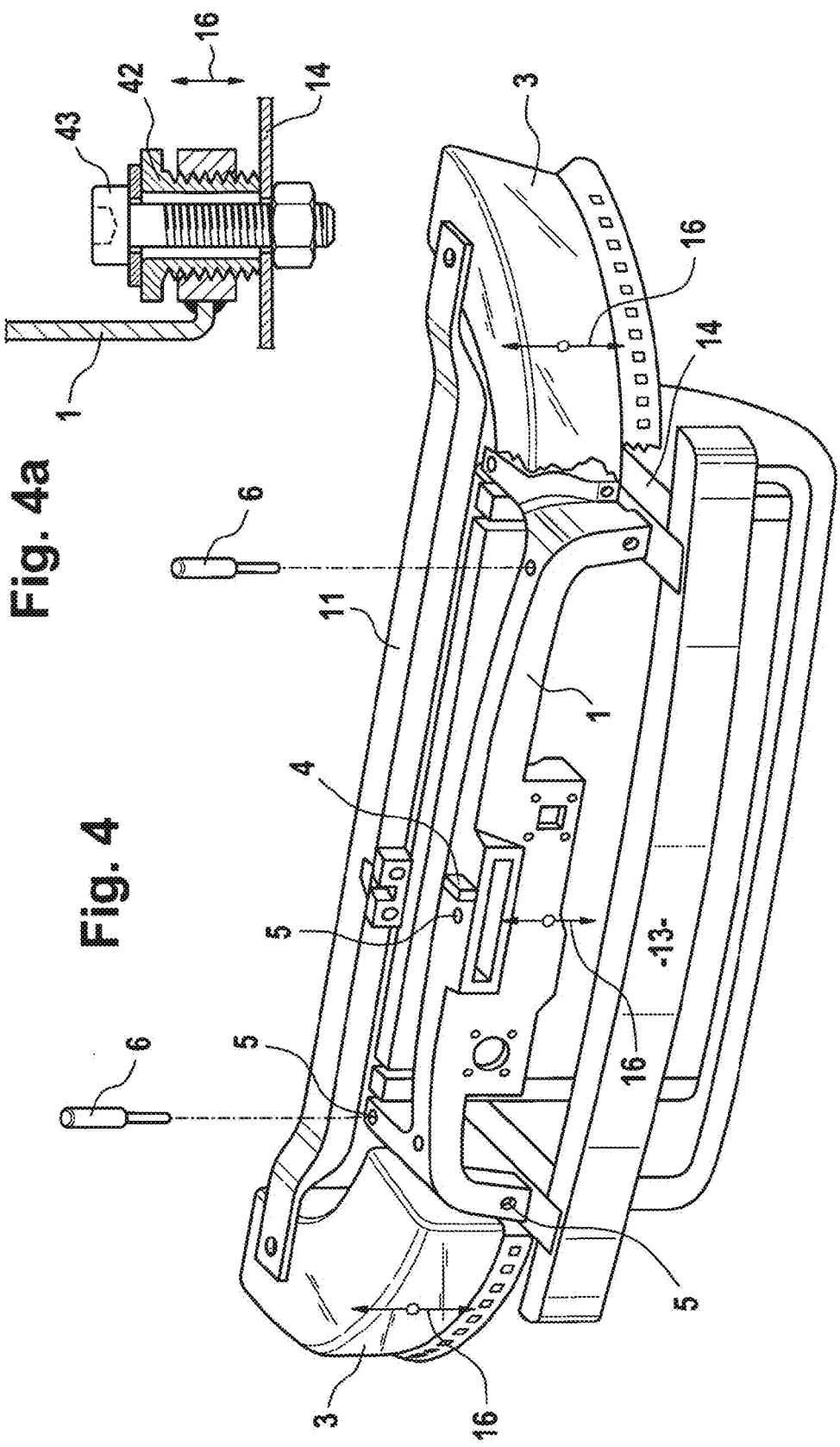
FIG. 4 shows a schematic view of the use of adjustment aids.

FIG. 4 shows an alternative embodiment compared to FIG. 3, wherein, in this case, the assembly tools are guided in the z-direction in order to enable the movement in direction 16. In this case, a screw can be used for example, wherein the screw is secured against an axial displacement in the direction of the screw axis and is fastened in an axially non-displaceable manner to the multi-functional support or to the body, wherein the body or the multi-functional support has a nut, which is formed in the manner of a counterpart and is secured against movement, for accommodating the screw rotatably. A variant with a hollow screw 2 is shown in FIG. 4a: by rotating the hollow screw 42, the position of the multi-functional support 1 can be displaced in the z-direction. A final fixing can then be implemented by means of a fixing screw 43 in the axial direction.

Figure 5:
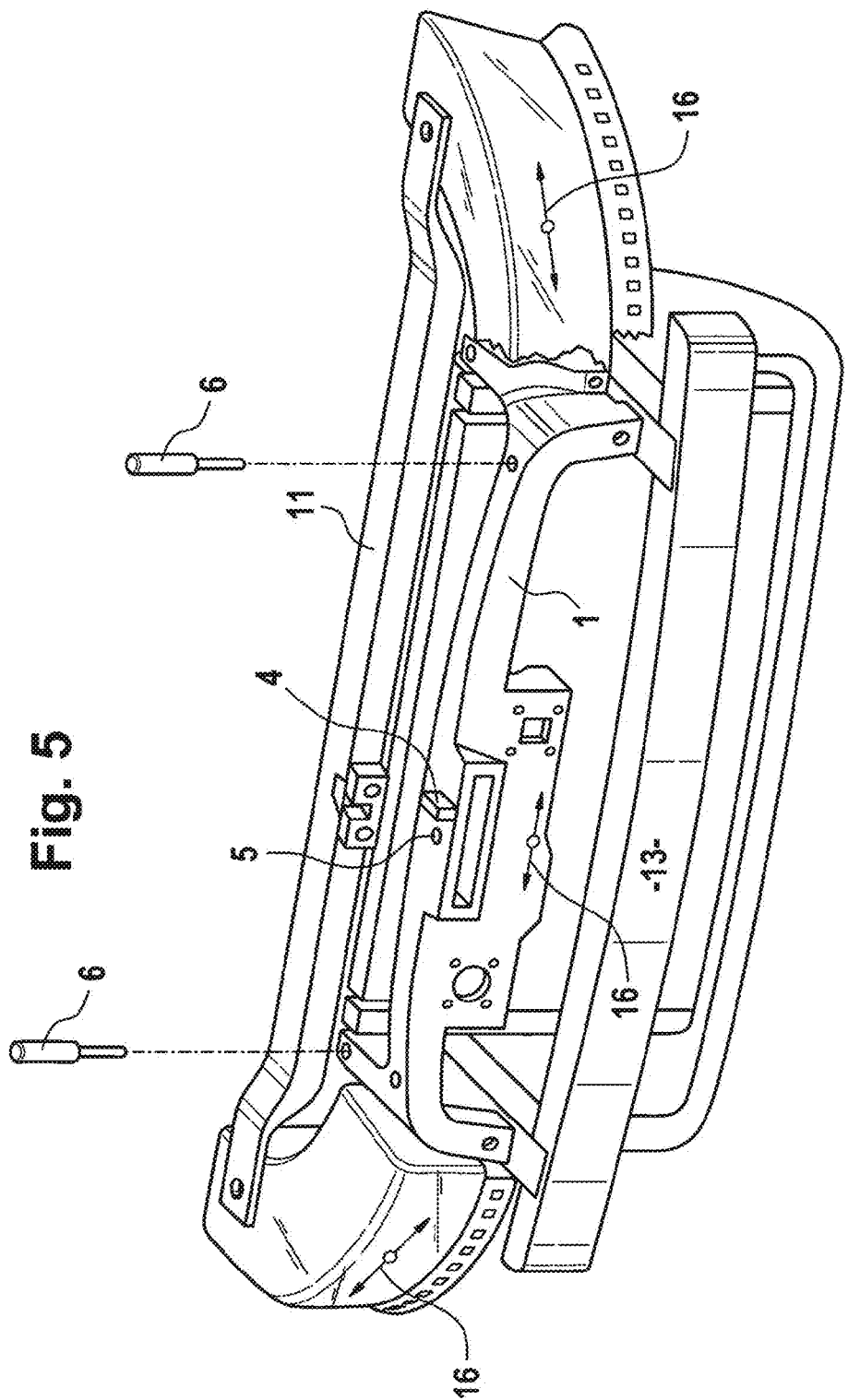
FIG. 5 shows a schematic view of the use of adjustment aids.

FIG. 5 corresponds to FIG. 4, wherein a movement in the y-direction (movement direction 16 in FIG. 5) is initiated here by rotation of the adjustment aid by means of the tool 6, however. It is thus possible to purposefully displace the multi-functional support and therefore the motor vehicle front elements in the y-direction.

Figure 6:
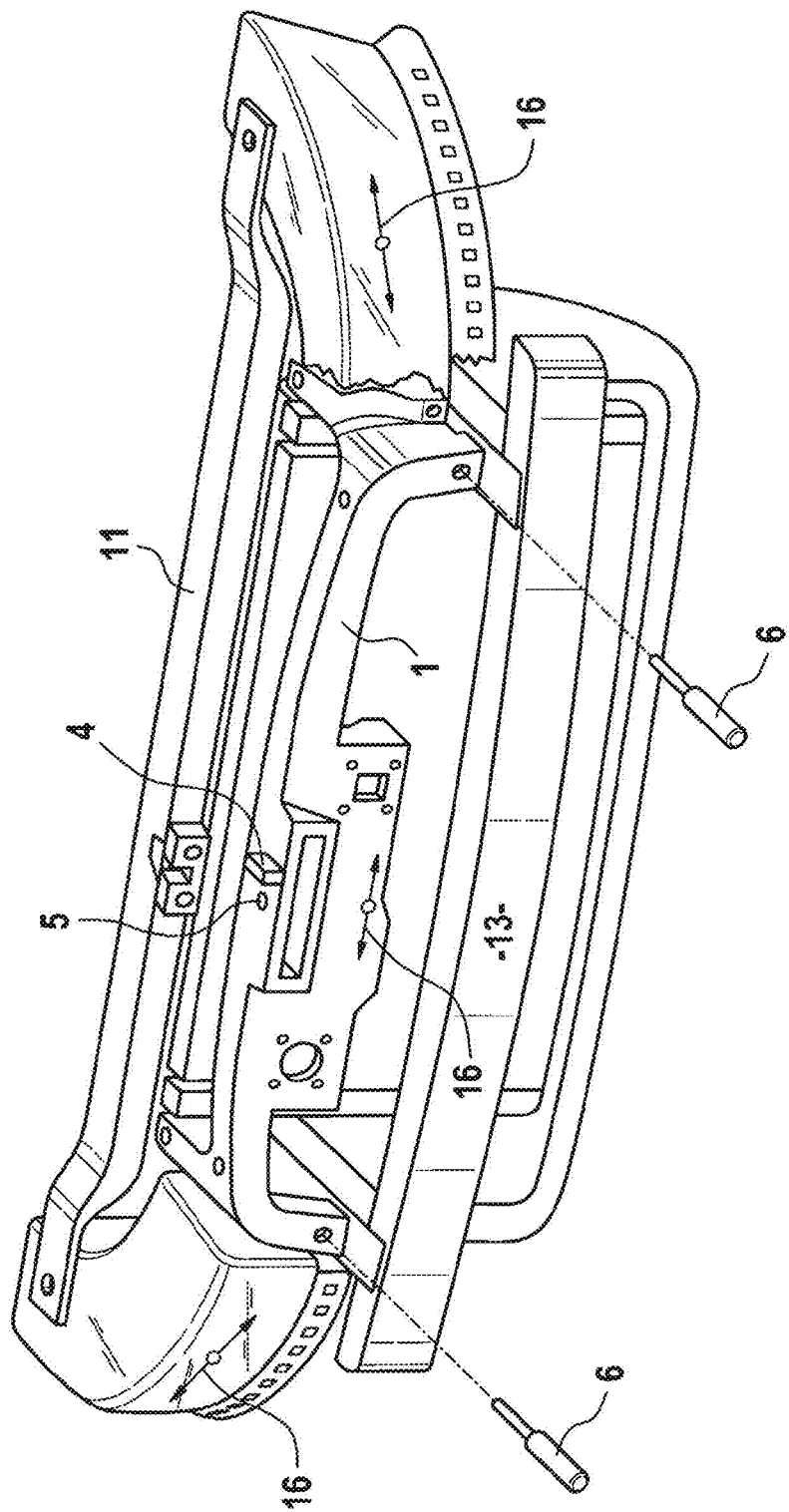
FIG. 6 shows a schematic view of the use of adjustment aids.

This is implemented in FIG. 6 by means of a guidance of the tool 6 in the x-direction.

It is noted that the alignment point denoted in FIGS. 2-6 by reference sign 4 can be used for example to implement a positioning, to be implemented in the y-direction, of the multi-functional support or of the motor vehicle front elements relative to the body and therefore relative to the adjacent outer motor vehicle trim parts. The alignment point can be aligned by displacement of the multi-functional support with a counter alignment point, for example an engine cover located thereabove. A positioning aid is thus provided in a simple manner. The use of alignment points on the multi-functional support and the outer motor vehicle trim parts is possible for positioning operations in all three dimensions.

Figure 7:
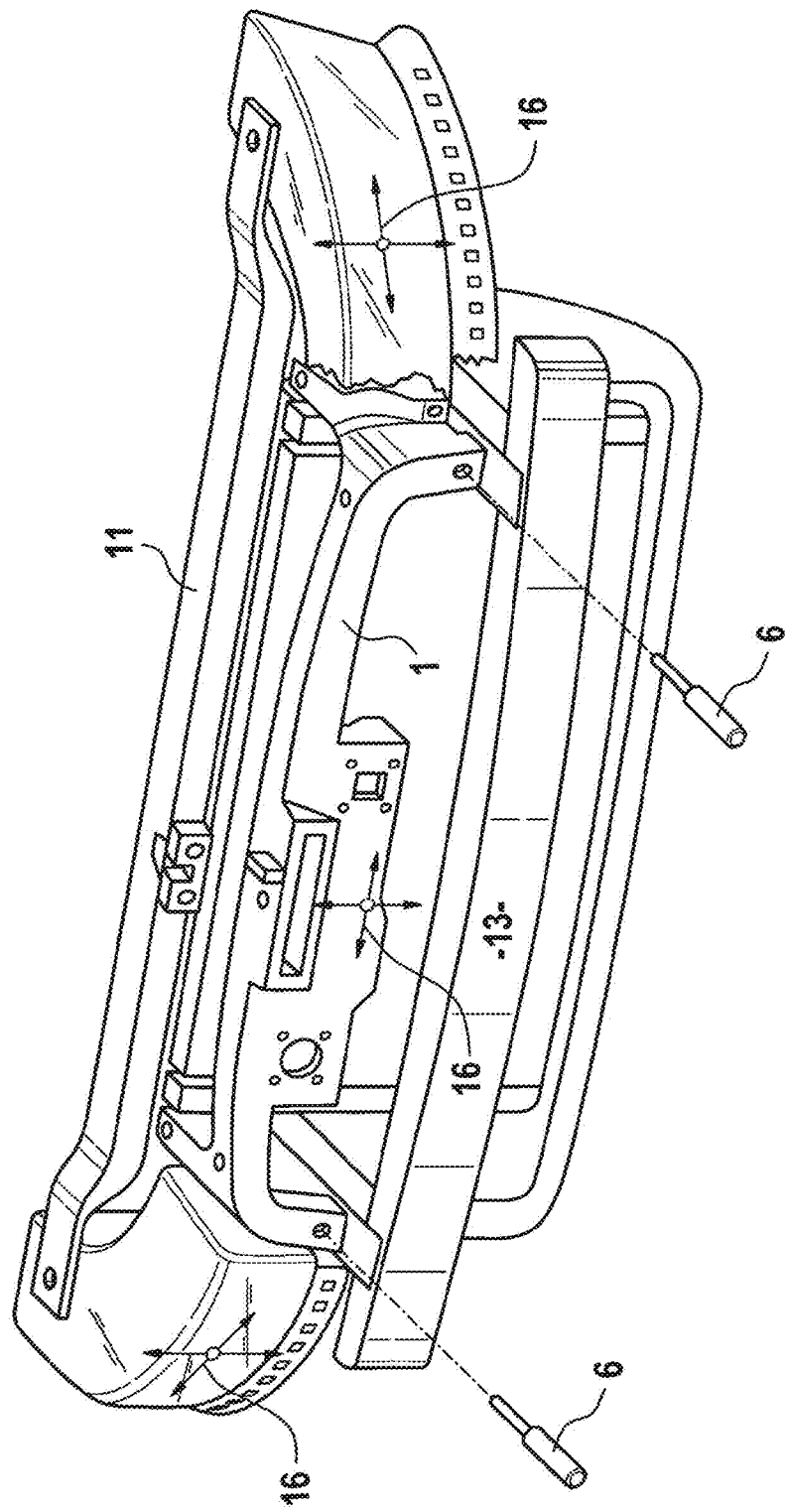
FIG. 7 shows a schematic view of the use of adjustment aids.

FIG. 7 shows a further embodiment of FIG. 6, wherein the movement in the z-direction is generated here by the rotation of the tool 6. In addition, it is possible to move the multi-functional support in the y-direction by manually pressing or sliding in the y-direction.

Figure 8:
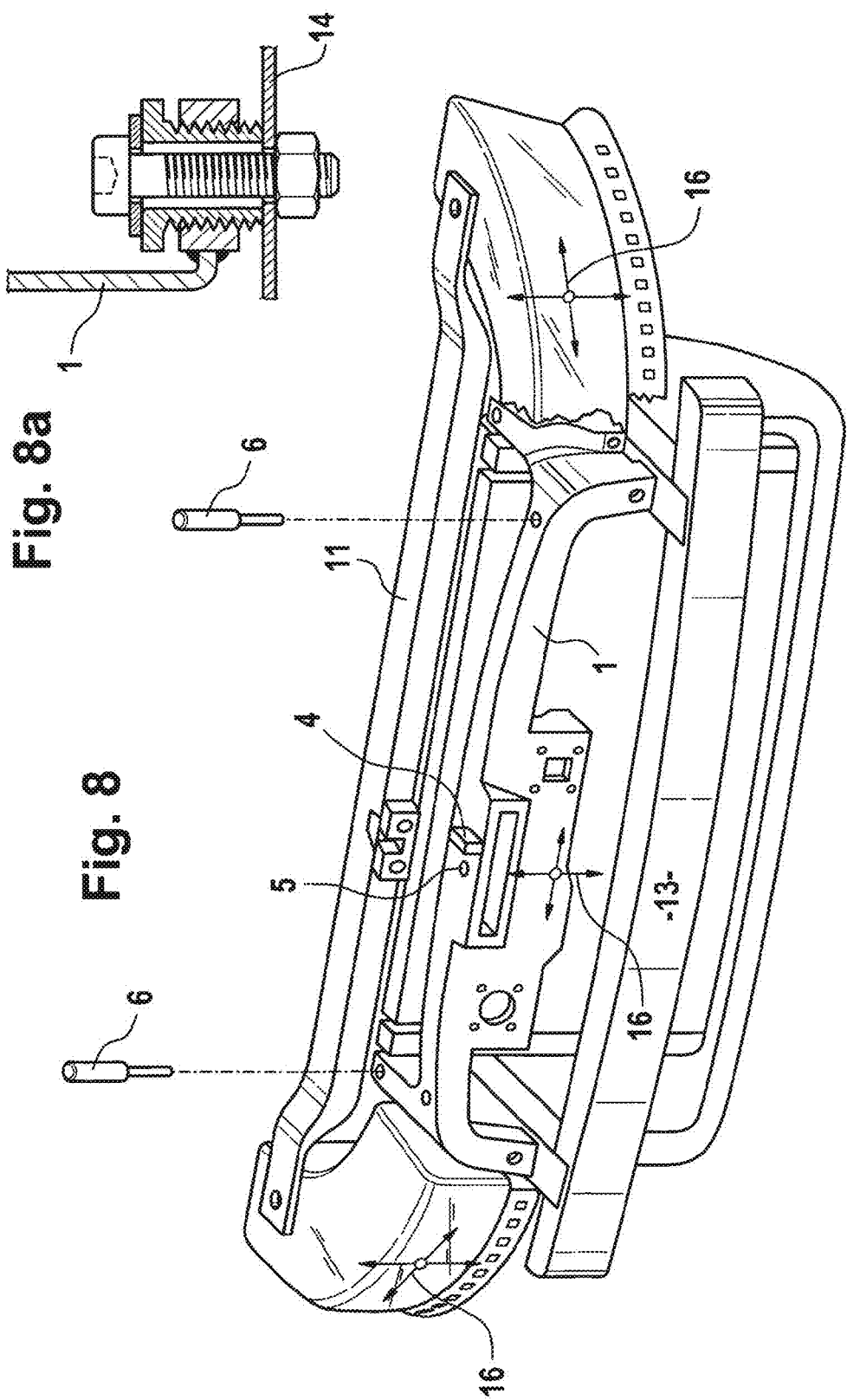
FIG. 8 shows a schematic view of the use of adjustment aids.

In the embodiment of FIG. 8, this occurs by inserting the tool 6 in the z-direction, wherein the movement in the z-direction is enforced by the rotation of the tool 6. By again pressing manually either onto the tool 6 and/or the multi-functional support or the motor vehicle front elements thereof, the movement in the y-direction can be enforced.

Figure 9:
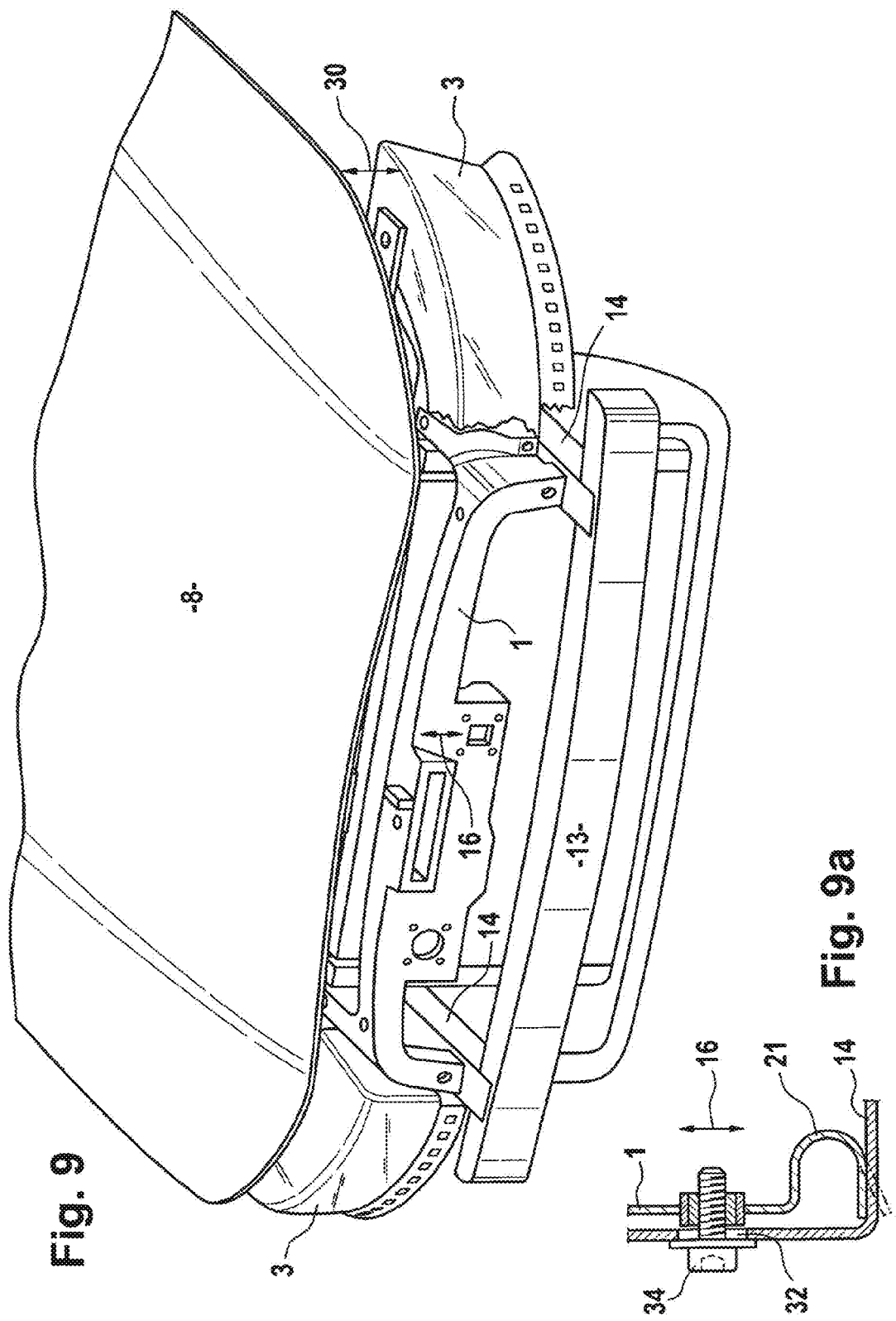
FIG. 9 shows a schematic view of a multi-functional support with the engine cover closed.

FIG. 9 shows a further detailed view of FIG. 2, wherein the engine cover 8 is additionally sketched here in the closed state. Here, the joint spacing 30 between the engine cover 8 and the headlights 3 can be seen. The objective is now to adjust the joint spacing 30 in a predefined manner. This occurs via the multi-functional support 1, which can be displaced relative to the body of the motor vehicle and, in the present case, relative to the crash boxes 14.

A resilient element between the multi-functional support 1 and the crash boxes assists the displacement process in this case. This resilient element is denoted by reference sign 21 in FIG. 9a. The multi-functional support 1 can be guided via a screw 34 in a slot 32 of the crash box 14. Once the screw 34 is released, it is possible by means of a force on the multi-functional support in direction 16, in the present case in the z-direction of the motor vehicle, to move the multi-functional support in the z-direction.

To this end, a person carrying out the installation process can displace the multi-functional support by hand when the engine cover is in the closed state. Alternatively, when the engine cover is closed, a spacer between the lower edge of the engine cover and the headlights can be used. The spacer thus defines the desired joint distance 30. If, in this case, the lid of the engine cover 8 is closed, a force is thus exerted indirectly in direction 16 from the engine cover onto the multi-functional support, against the resilience of the spring 21. When the engine cover is in the closed state, the screw 34 can then be tightened, whereby the multi-functional support 1 is fastened to the motor vehicle body.

Figure 10:
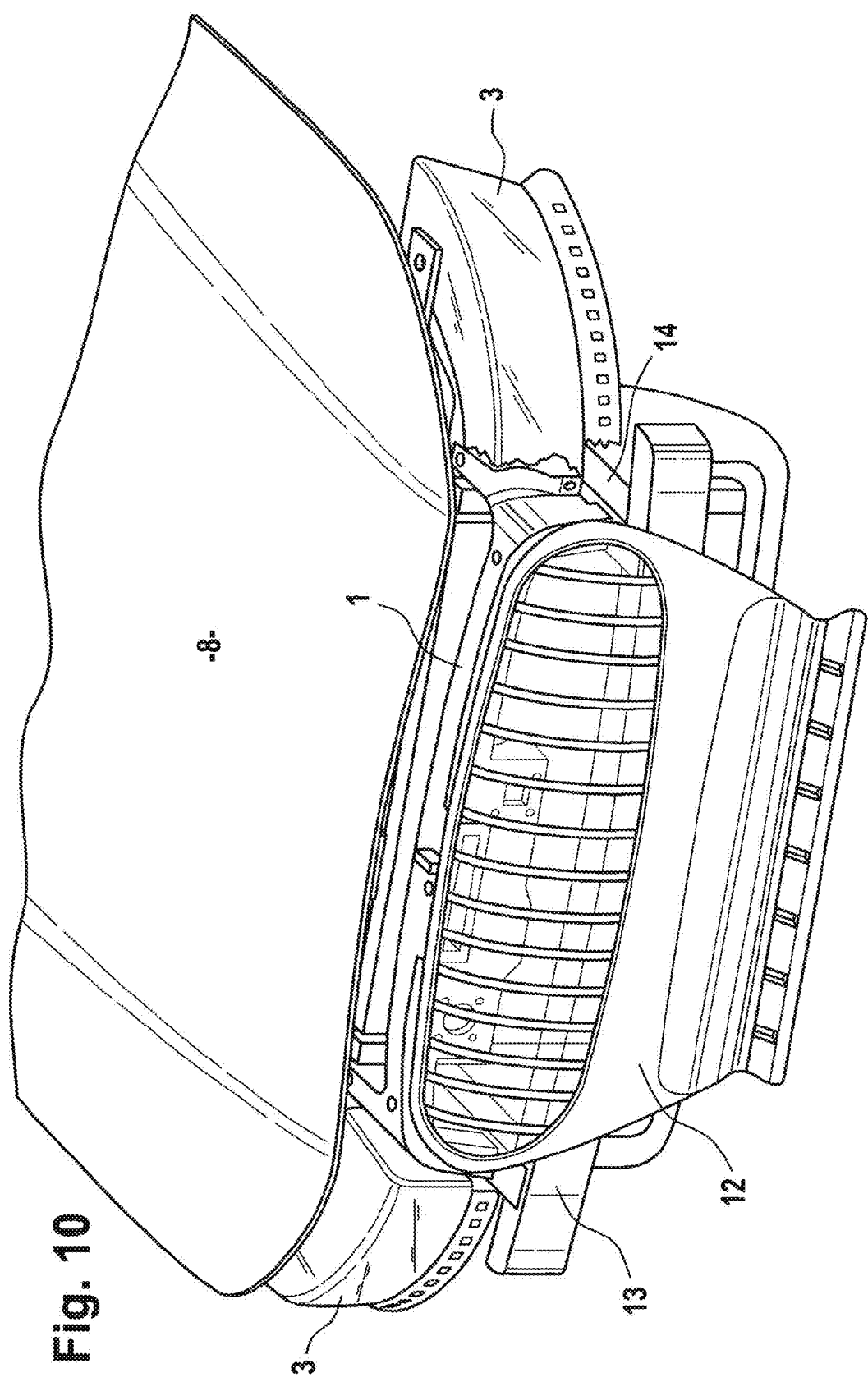
FIG. 10 shows a schematic view of a multi-functional support and an engine cover.

FIGS. 10 and 11 show further views of FIG. 9, wherein a radiator grille 12 (FIG. 10) and a bumper 2 (FIG. 11) are additionally shown. Generally, automatic alignment of the multi-functional support 1 is preferably performed, wherein, once the multi-functional support 1 has been fastened in a floating manner to the crash boxes 14, the engine cover 8, which has already been aligned beforehand, is closed. Here, the multi-functional support 1, which is biased by the resilient element 21, is aligned independently with the engine cover 8. The multi-functional support is then permanently fixed by the screws 34.

LIST OF REFERENCE SIGNS 1 multi-functional support
2 Bumper

3 Headlight
4 alignment point
5 fastening point
6 Tool
7 Mount
8 engine cover
11 support part
12 radiator grille
13 crossmember
14 crash box
16 Direction
21 spring element
30 Joint
32 Slot
34 Screw
42 hollow screw
43 fixing screw

What is claimed is:

1. A system comprising:
   a crossmember of the body of a motor vehicle;
   a multi-functional support for the motor vehicle;
   a plurality of mounts on the multi-functional support for accommodating, in a supporting manner, motor vehicle front elements; and
   a plurality of adjustment aids positioned and configured to couple the multi-functional support together with the received motor vehicle front elements in a floating manner on a body of the motor vehicle;
   wherein the crossmember is fastened to the body via crash boxes of the motor vehicle,
   wherein the multi-functional support is configured to be fixed to the body via one or more of the crossmember or the crash boxes,
   wherein the motor vehicle front elements are visible in the installed state in an outside top view of the motor vehicle,
   wherein the plurality of adjustment aids each comprise a releasable fixing element operable to couple the multi-functional support to the body and an adjustment element,
   wherein at least one of the adjustment aids is positioned and configured to displace the multi-functional support relative to the body in a first direction relative to the longitudinal axis of the motor vehicle, and
   wherein at least another one of the adjustment aids is positioned and configured to displace the multi-functional support relative to the body in a second direction relative to the longitudinal axis of the motor vehicle such that, by releasing the fixing element and by displacing the multi-functional support relative to the body, a joint line, which is visible in an outside top view of the motor vehicle, between the motor vehicle front elements and outer motor vehicle trim parts directly adjacent to the motor vehicle front elements can be adjusted in a predefined manner.

2. The system according to claim 1, wherein the fixing element is operable to be released prior to displacement and secured after displacement of the multi-functional support relative to the body.

3. The system according to claim 1, wherein the multi-functional support is rigid.

4. The system according to claim 1, wherein the motor vehicle front elements are design parts.

5. The system according to claim 1, wherein the motor vehicle front elements comprise at least one of a headlight, a radiator grille, a bumper, and a spoiler.

6. The system according to claim 1, wherein the multi-functional support is displaceable relative to the body in three dimensions.

7. The system according to claim 1, wherein the multi-functional support has a primary direction of extension in the transverse direction of the motor vehicle.

8. The system according to claim 1, wherein the multi-functional support is formed in one piece.

9. The system according to claim 1, wherein the multi-functional support extends over the entire width of the body.

10. The system according to claim 9, wherein the multi-functional support is formed in one piece.

11. The system according to claim 1, wherein at least one of the adjustment aids comprises a rotatable adjustment element configured and operable to couple the multi-functional support and the body, and wherein rotation of the rotatable adjustment element is operable to displace the multi-functional support relative to the body in a direction relative to a longitudinal axis of the vehicle once the fixing element has been released.

12. The system according to claim 11, wherein the rotatable adjustment element comprises an eccentric configured to be supported against the body and against the multi-functional support.

13. The system according to claim 11, wherein the outer motor vehicle trim parts comprise an engine cover, and wherein the first direction is the z-direction of the motor vehicle.

14. The system according to claim 11, wherein the rotatable adjustment element comprises a screw, wherein the screw is secured against an axial displacement in the direction of the screw axis and is fixed in an axially non-displaceable manner to the multi-functional support or to the body, and wherein the body or the multi-functional support comprises a nut, which is formed in the manner of a counterpart and is secured against movement, for accommodating the screw rotatably.

15. The system according to claim 1, wherein the adjustment element of at least one of the plurality of adjustment aids comprising a resilient element positionable between the multi-functional support and the body, and wherein the multi-functional support is automatically displaceable relative to the body in the first direction relative to the longitudinal axis of the vehicle once the fixing element has been released.

16. The system according to claim 15, wherein at least one of the adjustment aids comprises a rotatable adjustment element configured and operable to couple the multi-functional support and the body, and wherein rotation of the rotatable adjustment element is operable to displace the multi-functional support relative to the body in a direction relative to a longitudinal axis of the vehicle once the fixing element has been released.

17. The system according to claim 15, wherein the fixing element is operable to be released prior to displacement and secured after displacement of the multi-functional support relative to the body.

18. The system according to claim 15, wherein the outer motor vehicle trim parts comprise an engine cover, and wherein the first direction is the z-direction of the motor vehicle.

19. The system according to claim 18, wherein the automatic displacement in the first direction can be implemented by closing the engine cover.

20. A method for installing motor vehicle front elements on a body of a motor vehicle, the method comprising the following steps:

(a) installing the motor vehicle front elements on a multi-functional support;
(b) providing a plurality of adjustment aids positioned and configured to couple the multi-functional support, together with the received motor vehicle front elements, in a floating manner on a body of the motor vehicle;
   wherein the plurality of adjustment aids each comprise a releasable fixing element operable to couple the multi-functional support to the body and an adjustment element,
(c) fixing the multi-functional support supporting the motor vehicle front elements to the body by using the plurality of adjustment aids;
(d) releasing the fixing element and displacing the multi-functional support relative to the body; and
(e) subsequently fixing the multi-functional support to the body;
wherein a crossmember is fastened to the body via crash boxes of the motor vehicle,
wherein the multi-functional support is configured to be fixed to the body via the crossmember or the crash boxes,
wherein the multi-functional support comprises a plurality of mounts for accommodating, in a supporting manner, the installed motor vehicle front elements,
wherein the motor vehicle front elements are visible in the installed state in an outside top view of the motor vehicle,
wherein at least one of the adjustment aids is positioned and configured to displace the multi-functional support relative to the body in a first direction relative to the longitudinal axis of the motor vehicle,
wherein at least another one of the adjustment aid is positioned and configured to displace the multi-functional support relative to the body in a second direction relative to the longitudinal axis of the motor vehicle, and
wherein the displacement occurs such that a joint line, which is visible in an outside top view of the motor vehicle, between the motor vehicle front elements and outer motor vehicle trim parts directly adjacent to the motor vehicle front elements is adjusted in a predefined manner.

* * * * *